US011456890B2

(12) United States Patent
Zhou et al.

(10) Patent No.: US 11,456,890 B2
(45) Date of Patent: Sep. 27, 2022

(54) OPEN AND SAFE MONITORING SYSTEM FOR AUTONOMOUS DRIVING PLATFORM

(71) Applicant: Baidu USA LLC, Sunnyvale, CA (US)

(72) Inventors: Shengjin Zhou, Sunnyvale, CA (US); Davy Huang, Sunnyvale, CA (US); Tiffany Zhang, Sunnyvale, CA (US); Dan N. Retter, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/513,682

(22) Filed: Jul. 16, 2019

(65) Prior Publication Data

US 2021/0021442 A1 Jan. 21, 2021

(51) Int. Cl.
*H04L 12/40* (2006.01)
*H04L 47/62* (2022.01)
*H04L 49/9047* (2022.01)
*B60R 16/023* (2006.01)
*G05D 1/00* (2006.01)
*G05D 1/02* (2020.01)
*H04L 67/12* (2022.01)

(52) U.S. Cl.
CPC .. *H04L 12/40026* (2013.01); *H04L 12/40019* (2013.01); *H04L 47/62* (2013.01); *H04L 49/9047* (2013.01); *B60R 16/0232* (2013.01); *G05D 1/0088* (2013.01); *G05D 1/0212* (2013.01); *G05D 2201/0213* (2013.01); *H04L 67/12* (2013.01); *H04L 2012/4026* (2013.01); *H04L 2012/40273* (2013.01)

(58) Field of Classification Search
CPC .............. G05D 1/0212; G05D 1/0088; G05D 2201/0213
See application file for complete search history.

(56) References Cited

U.S. PATENT DOCUMENTS

| 2015/0088999 A1* | 3/2015 | Carr ........................ H04L 67/02 709/206 |
| 2015/0234382 A1* | 8/2015 | Ju ........................... G01S 7/003 701/23 |
| 2019/0106117 A1* | 4/2019 | Goldberg ............... B60W 30/00 |
| 2020/0137580 A1* | 4/2020 | Yang .................. H04W 12/1202 |
| 2020/0209855 A1* | 7/2020 | Shen .................... G05D 1/0088 |

* cited by examiner

*Primary Examiner* — Jeffrey M Rutkowski
*Assistant Examiner* — Chae S Lee
(74) *Attorney, Agent, or Firm* — Womble Bond Dickinson (US) LLP

(57) ABSTRACT

In one embodiment, a system for operating an autonomous driving vehicle (ADV) includes a number of modules. These modules include at least a perception module to perceive a driving environment surrounding the ADV and a planning module to plan a path to drive the ADV to navigate the driving environment. The system further includes a bus coupled to the modules and a sensor processing module communicatively coupled to the modules over the bus. The sensor processing module includes a bus interface coupled to the bus, a sensor interface to be coupled to a first set of one or more sensors mounted on the ADV, a message queue to store messages published by the sensors, and a message handler to manage the messages stored in the message queue. The messages may be subscribed by at least one of the modules to allow the modules to monitor operations of the sensors.

20 Claims, 10 Drawing Sheets

OPEN AND SAFE MONITORING SYSTEM FOR AUTONOMOUS DRIVING PLATFORM

TECHNICAL FIELD

Embodiments of the present disclosure relate generally to operating autonomous vehicles. More particularly, embodiments of the disclosure relate to a monitoring system for an autonomous driving platform.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

For an autonomous driving platform, sensors and other hardware components' status need to be collected and reported for system operations and safety purposes. Moreover, monitoring mechanism needs to be open enough to allow components to be plugged and play, to be reliable to meet functional safety requirement, and to provide more flexibility for software communication protocols and applications. There has been a lack of efficient monitoring mechanisms for autonomous driving platforms.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
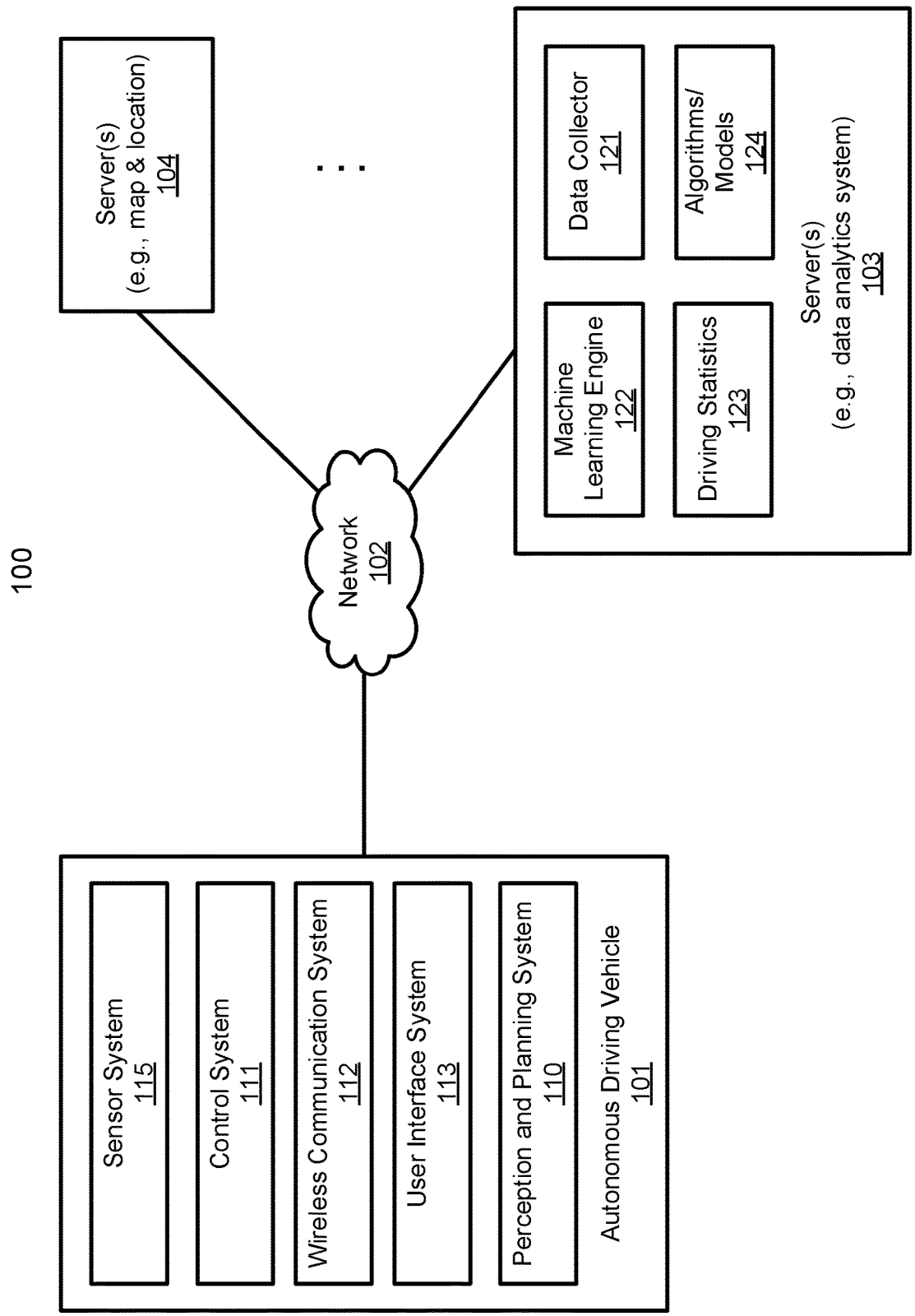
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a monitoring system is utilized to actively collect sensor information in various manners through available automotive standard compliant protocols, integrate plug-and-play distributed components, and communicate with flexible software application clients to achieve an open and safe monitoring mechanism. This may service a single chip and sensors architecture, or a heterogeneous integrated computing and sensor system. The monitoring system is based on a publisher/subscriber messaging system to allow components involved to freely communicate with each other regarding the operating status or controls.

According to one aspect, a system for operating an autonomous driving vehicle (ADV) includes a number of modules. These modules include at least a perception module to perceive a driving environment surrounding the ADV and a planning module to plan a path to drive the ADV to navigate the driving environment. The system further includes a bus coupled to the modules and a sensor processing module communicatively coupled to the modules over the bus. The sensor processing module includes a bus interface coupled to the bus, a sensor interface to be coupled to a first set of one or more sensors mounted on the ADV, a message queue to store messages published by the sensors, and a message handler to manage the messages stored in the message queue. The messages may be subscribed by at least one of the modules to allow the modules to monitor operations of the sensors.

In one embodiment, the message queue includes a number of message buffers, each corresponding to one of the sensors to store the messages published or subscribed by the sensor. In one embodiment, in response to a first message received from a first sensor as a publisher via the sensor interface, the message handler is configured to convert the first message in a first format to a second message in a second format, store the second message in the message queue, and notify via the bus interface a first module of the modules registered as a subscriber to allow the first module to receive the second message. The first format is specified according to a design specification of the first sensor. The second format is a predetermined format capable of being handled by the modules. In response to a third message received from a second sensor via the sensor interface, the message handler is configured to convert the third message in a third format to a fourth message in a fourth format and store the fourth message in the message queue. The third format is specified according to a design specification of the second sensor. The first and second sensors may be different sensors from different sensors providers.

According to one embodiment, in response to a third message received via the bus interface a third sensor of one or more sensors of a second set coupled to the bus, the message handler is configured to convert the third message in a third format to a fourth message in the second format and store the fourth message in the message queue. In one embodiment, the message handler further determines that a second module of the modules that has registered to subscribe messages published by the second sensor. In response, the message handler notifies the second module via the bus interface to allow the second module to access the fourth message stored in the message queue.

According to one embodiment, in response to receiving a third message in the second format via the bus interface from a second module, the message handler determines that the third message has been subscribed by a second sensor of the first set. The message handler further converts the third message from the second format to a third format and transmits the third message in the third format to the second sensor via the sensor interface. The sensors of the first set may include at least one of a LIDAR device, a RADAR device, or a camera. The bus may be a peripheral component interconnect express (PCIe) bus or an Ethernet connection.

According to another aspect, a sensor processing module includes a sensor interface to be coupled to sensors mounted on an autonomous driving vehicle (ADV) and a bus interface to be coupled to a host processor executing one or more autonomous driving modules. The autonomous driving modules include a perception module to perceive a driving environment surrounding the ADV and a planning module to plan a path to control the ADV to navigate the driving environment. The sensor processing module further includes a message-based monitoring module coupled to the sensor interface and the bus interface. The message-based monitoring module is configured to maintain a message queue to store a plurality of messages published by the sensors, and manage the messages stored in the message queue, wherein the messages are subscribed by the autonomous driving modules to allow the autonomous driving modules to monitor operations of the sensors.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
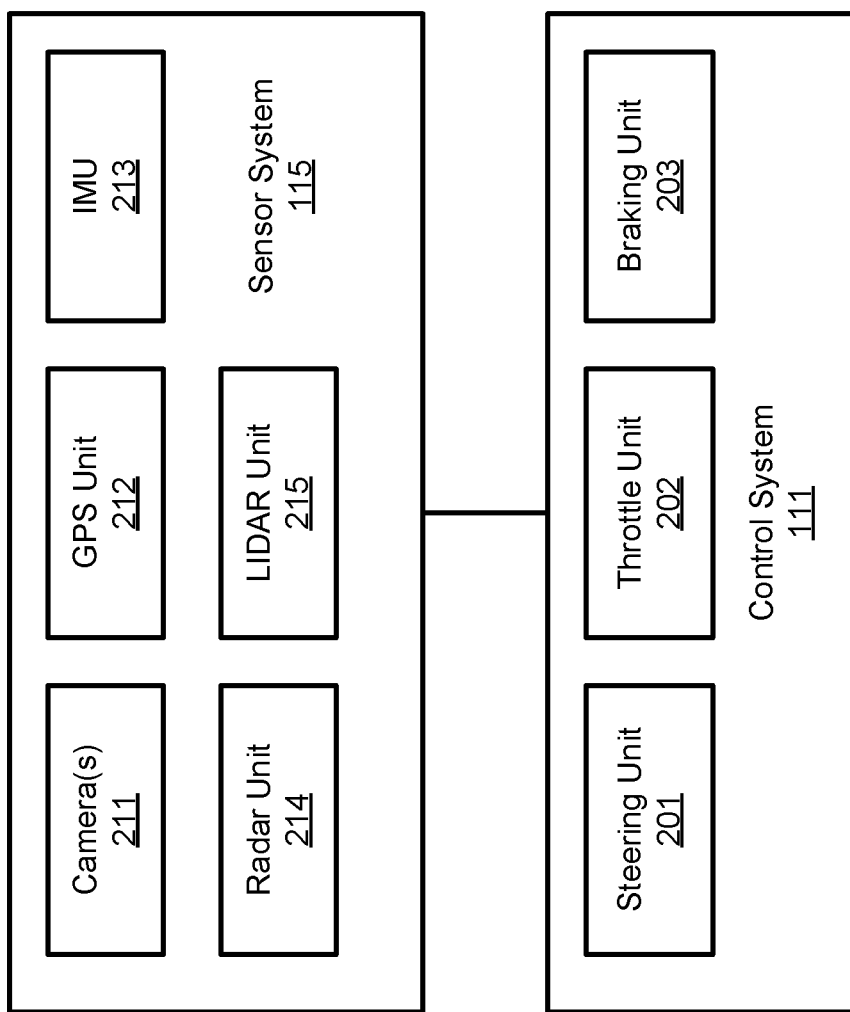
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include perception, prediction, and planning rules or methods to autonomously drive a vehicle. Algorithms 124 can then be uploaded on ADVs to be utilized during autonomous driving in real-time.

Figure 3A:
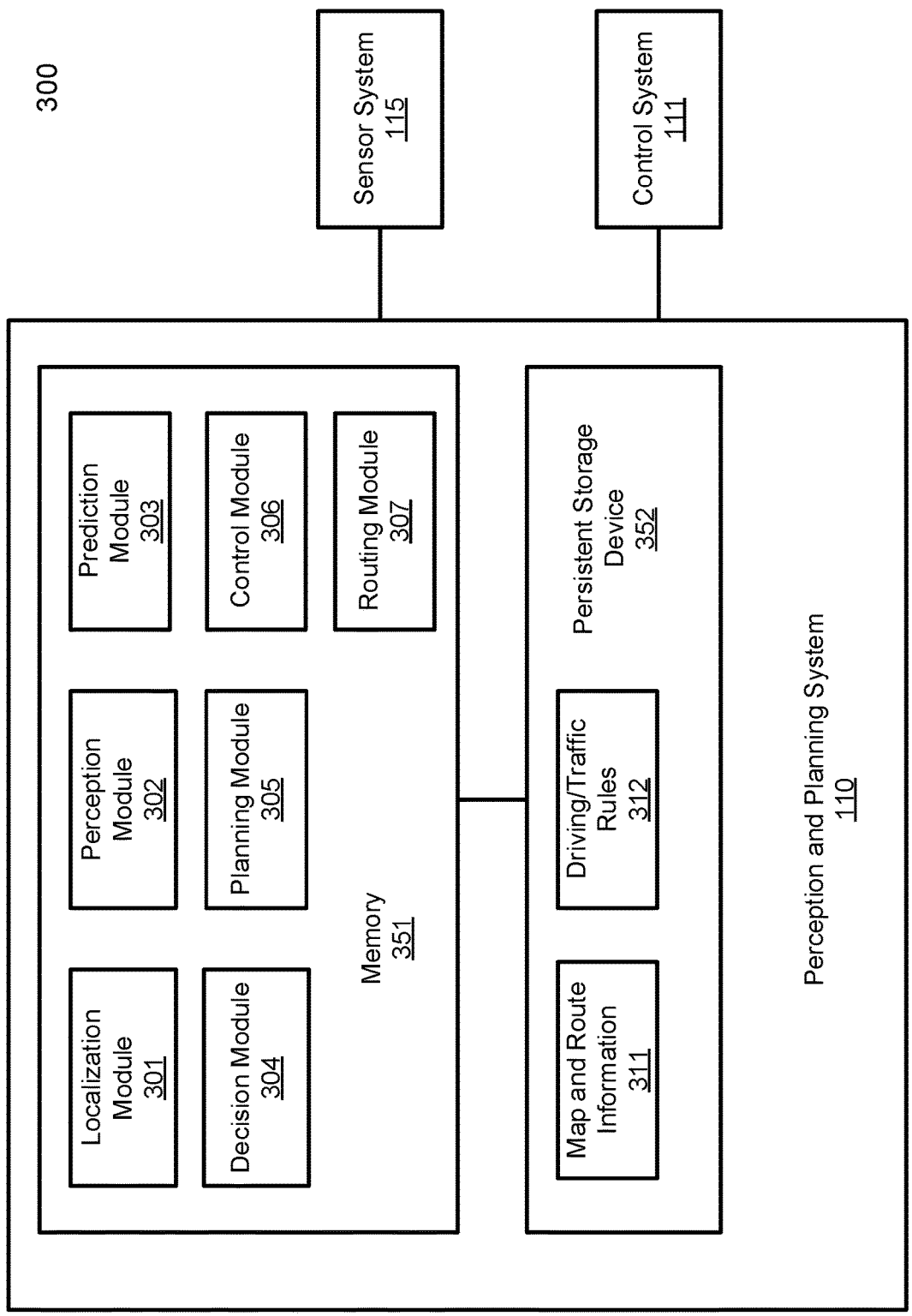
FIGS. 3A-3B are block diagrams illustrating an example of a perception and planning system used with an autonomous vehicle according to one embodiment.
Figure 3B:
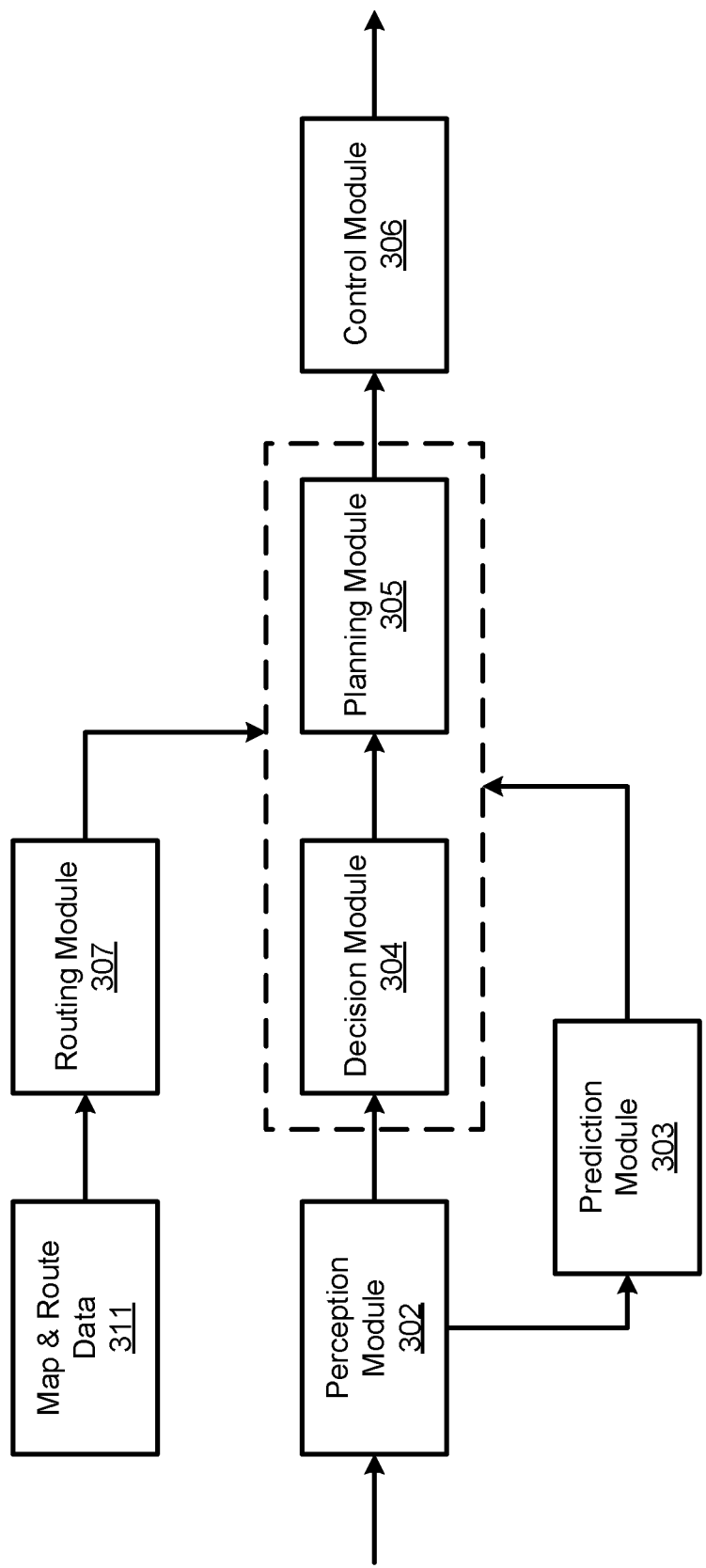

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The modules as shown in FIGS. 3A-3B are referred to as autonomous driving modules. According to one embodiment, these modules may communicate with sensor system 115 and control system 111 via a messaged monitoring system, for exchanging operating states, during autonomous driving, which will be described in details further below.

Figure 4:
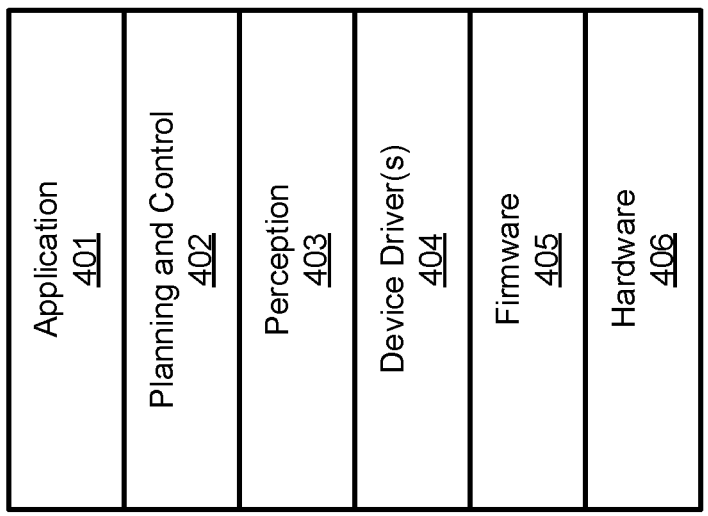
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
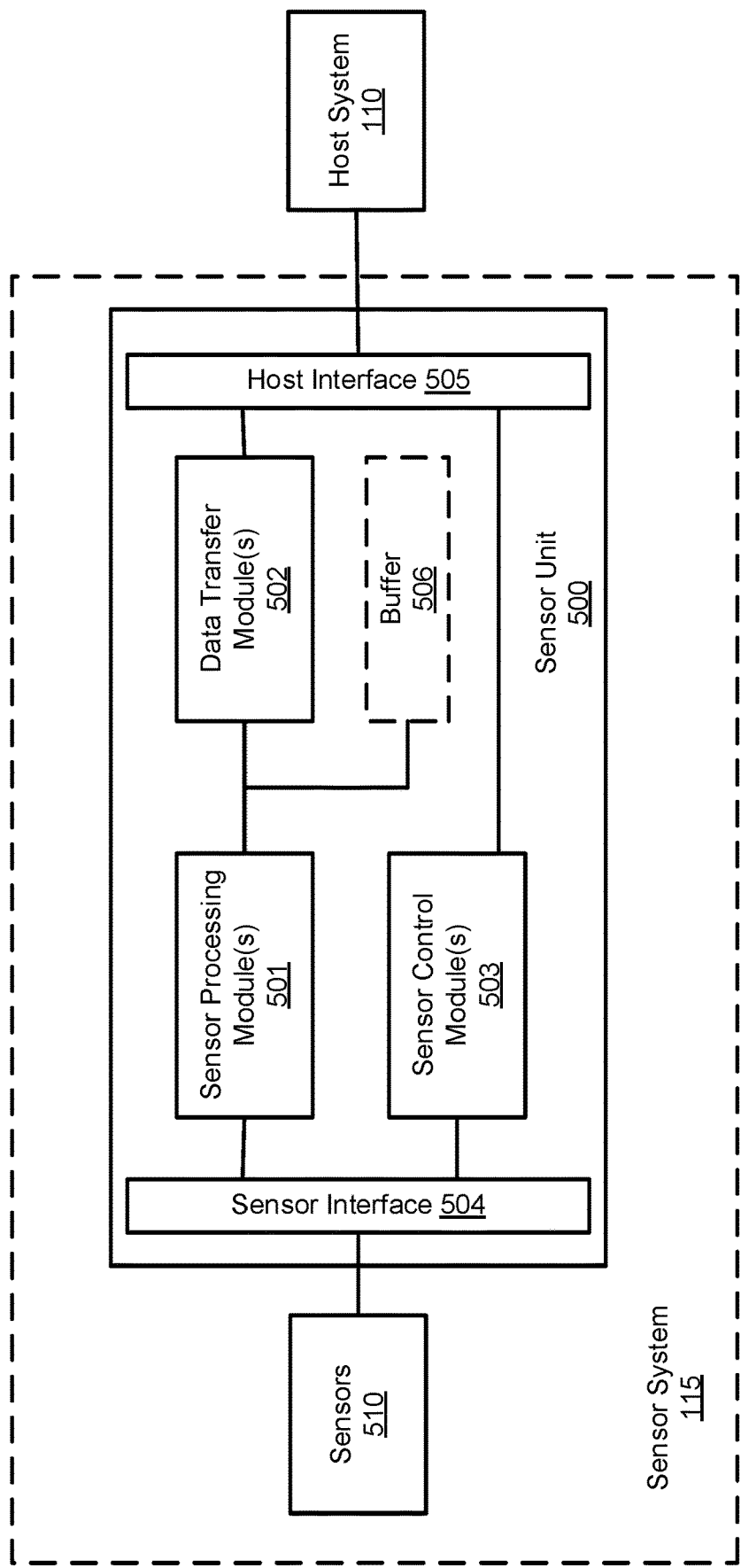
FIGS. 5A and 5B are block diagrams illustrating an example of a sensor unit according to one embodiment.

FIG. 5A is a block diagram illustrating an example of a sensor system according to one embodiment of the invention. Referring to FIG. 5A, sensor system 115 includes a number of sensors 510 and a sensor unit 500 coupled to host system 110. Host system 110 represents a planning and control system as described above, which may include at least some of the modules as shown in FIGS. 3A and 3B. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel includes a specific sensor processing module and a specific data transfer module that have been configured or programmed to handle the corresponding sensor data and protocol, as shown in FIG. 5B.

Figure 5B:
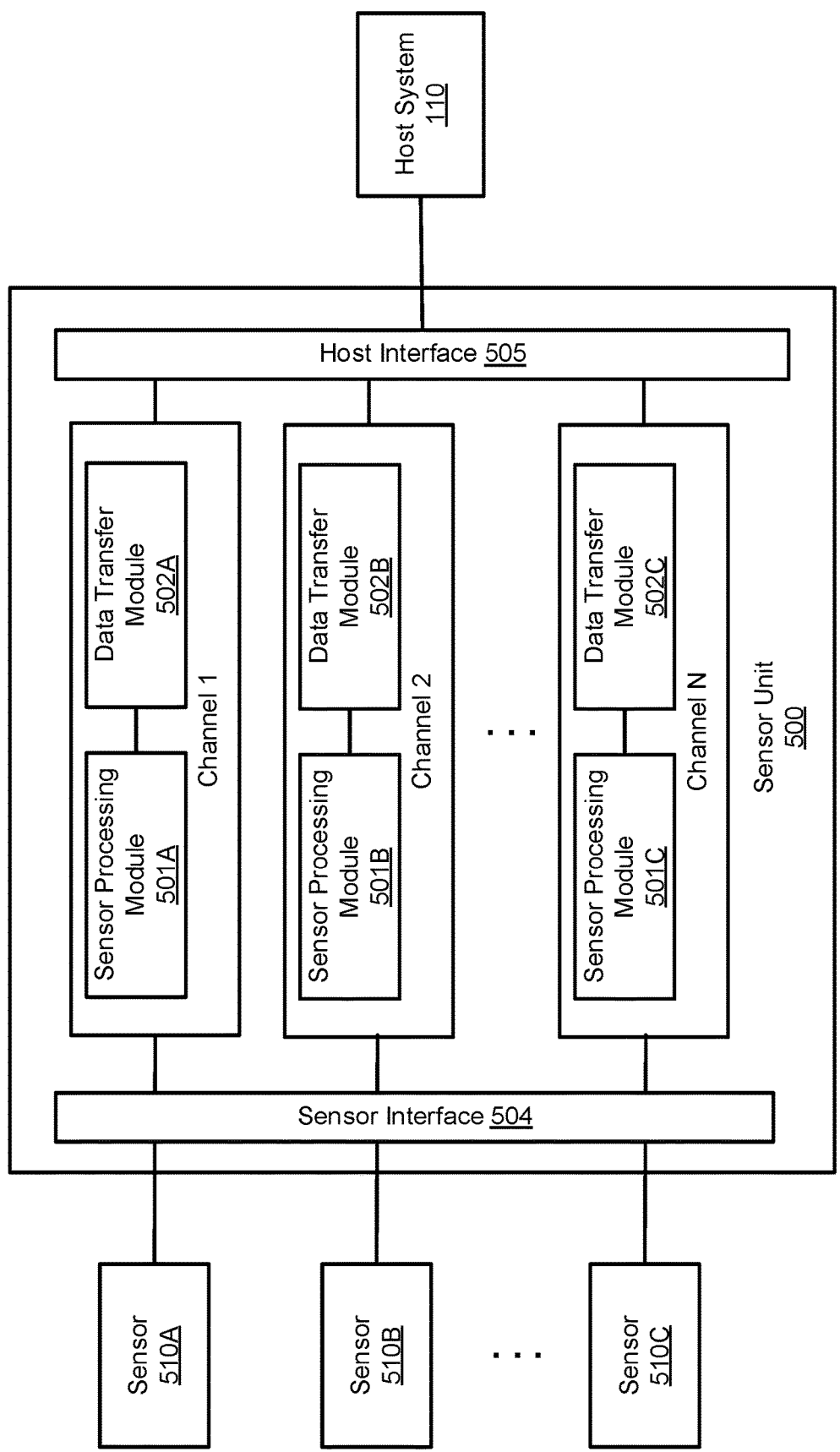

Referring now to FIG. 5B, sensor processing modules 501A-501C are specifically configured to process sensor data obtained from sensors 510A-510C respectively. Note that sensors 510A-510C may the same or different types of sensors. Sensor processing modules 501A-501C can be configured (e.g., software configurable) to handle different sensor processes for different types of sensors. For example, if sensor 510A is a camera, processing module 501A can be figured to handle pixel processing operations on the specific pixel data representing an image captured by camera 510A. Similarly, if sensor 510A is a LIDAR device, processing module 501A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 502A-502C can be configured to operate in different modes, as different kinds of sensor data may be in different size or sensitivities that require different speed or timing requirement. According to one embodiment, each of data transfer modules 502A-502C can be configured to operate in one of a low latency mode, a high bandwidth mode, and a memory mode (also referred to as a fixed memory mode).

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

Figure 6:
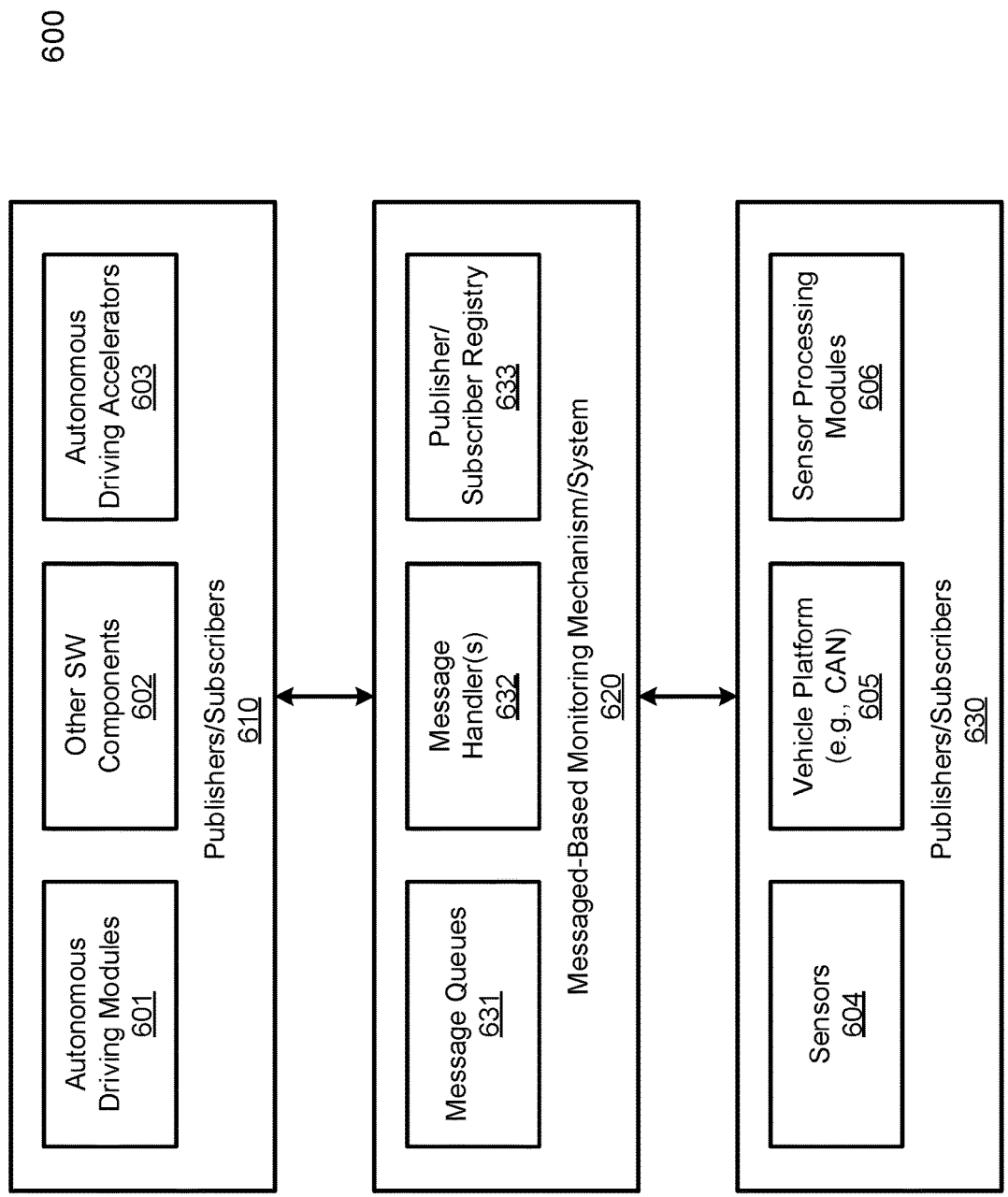
FIG. 6 is a block diagram illustrating an example of a message-based monitoring architecture for autonomous driving according to one embodiment.

FIG. 6 is a block diagram illustrating an example of a messaged-based monitoring system for autonomous driving according to one embodiment. Referring to FIG. 6, monitoring system 600 includes message publishers and subscribers 610 and 630 communicate with each other via a message-based monitoring mechanism 620. Each of the components or modules involved can be a message publisher, a message subscriber, or both, for example, registering itself in message registry 633 maintained by monitoring mechanism 620.

Publishers/subscribers 610 include autonomous driving modules 601, other software components 602 (e.g., operating system, other applications), and autonomous driving accelerators 603 (e.g., general-purpose processors or GPUs). Autonomous driving modules 601 can be any of the modules as shown in FIGS. 3A-3B. Autonomous driving accelerators 603 can be an FPGA or ASIC specifically configured to perform a specific task such as an artificial intelligence (AI) processor running a neural network model for object detection or prediction. Publishers/subscribers 630 include sensors 604, vehicle platform 605 such as a CAN bus, and sensor processing modules 606. Sensors 604 can be any of the sensors as shown in FIG. 2. Sensor processing modules 606 can be any of the sensor units as shown in FIGS. 5A-5B.

Each of the Publishers/subscribers 610 and 630 can register as a publisher and/or a subscriber in registry 633. Message-based monitoring mechanism 620 includes one or more message queues 631 to store the messages published by publishers and subscribed by subscribers. Message handler 632 is configured to manage the messages stored in message queues 631, including notifying message subscribers regarding the newly published messages. According to one embodiment, message-based monitoring mechanism 620 may be implemented in a distributed manner. For example, it may be implemented within a sensor processing module 606 to manage messages published/subscribed by sensors 604.

Figure 7:
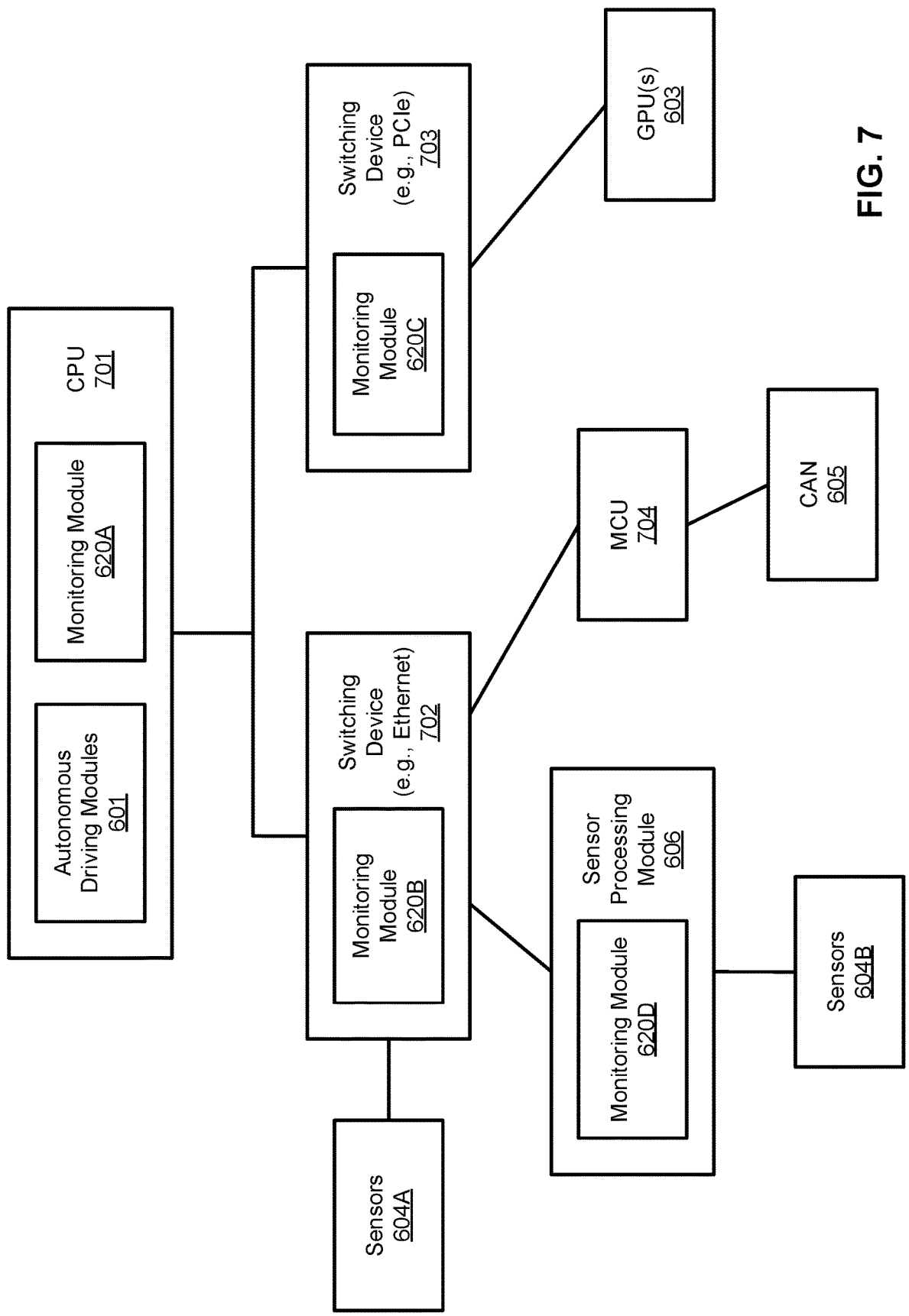
FIG. 7 is a block diagram illustrating an example of a message-based monitoring system for autonomous driving according to one embodiment.

FIG. 7 is a block diagram illustrating autonomous driving system architecture according to one embodiment. Referring to FIG. 7, system architecture 700 includes a central processing unit (CPU) 601 executing software components such as autonomous driving modules 601 communicatively coupled to other components such as sensors 604A-604B, vehicle platform/CAN bus 605 over a switching device (e.g., Ethernet switch) and GPUs 603 over switching device 703 (e.g., PCIe switch). At least one sensor processing module 606 is positioned between sensors 604B and switching device 702. As shown in FIG. 7, according to one embodiment, the messaged-based monitoring mechanisms/modules 620A-620D are designed and implemented in a distributed manner.

For example, messaged-based monitoring module 620A is responsible for handling messages published by its clients such as autonomous driving modules 601. Similarly, messaged-based monitoring modules 620B-620D are responsible handling messages published by their clients 604A and micro-controller unit (MCU) 704, GPUs 603, and sensors 604B, respectively. In one embodiment, when client 601 (e.g., perception module 302) posts a message to one of sensors 604B (e.g., a query for sensor status), the message is processed by monitoring module 620A and stored in a message queue or buffer associated with monitoring module 620A. The message posted by client 601 may be in a format compatible with client 601 as a publisher. The message may be converted to a format compatible to client 604B as a subscriber prior to being stored in the message queue by monitoring module 620A. Alternatively, the message may be transmitted based on subscription registry associated with monitoring module 620A and stored in a message queue associated with monitoring module 620D. The message may be converted to a format compatible with subscribing client 604B by monitoring module 620D.

Similarly, other monitoring modules 620B-620D operate in a similar manner for handling the messages published by their respective clients or by remote clients (e.g., clients 601). In one embodiment, all of the autonomous driving modules 601 may post and receive messages in a common format, while sensors 604A-604B, CAN 605, and GPUs 603 may have different message formats, because they may be provided by different providers or manufacturers. The monitoring modules 620A-620D are responsible for converting or translating the messages between their publishing clients and subscribing clients, such that any client can simply be plugged in and play in the autonomous driving system.

According to one embodiment, sensor processing module may represent any of the sensor units as shown in FIGS. 5A-5B. The monitoring module 620D may be implemented between a sensor interface coupled to sensors 604B and a bus interface coupled to a bus connected with switching device 702. In one embodiment, monitoring module 620B may be optional, where monitoring module 620D is responsible handling messages published and subscribed by sensors 604A. Similarly, monitoring module 620C may be optional, where monitoring module 620D may be responsible for handling messages published and subscribed by GPUs 603. When sensor 604A publishes a message, in one embodiment, the message is transmitted to monitoring module 620D via switching device 702 and the bus interface of sensor processing module 606. Similarly, according to one embodiment, when GPU 603 publishes a message, the message is routed from GPU 603, via switching devices 702-703 and to the bus interface of sensor processing module 606. In this example, monitoring module 620D is responsible for translating different message formats of sensors 604A-604B and GPUs 603 to a common message format associated with the autonomous driving modules 601, or vice versa. In one embodiment, each monitoring module maintains a specific message queue to store messages for each of its clients.

In one embodiment, the messages may be related to operating status of sensors such as a camera, a LIDAR device, a RADAR device, etc. as shown in FIG. 2. A message may include a query form an autonomous driving module to query for a status of a particular sensor. A returning message may include the queried status such as error code of the corresponding sensor. A message may include a sensor ID identifying the sensor, an error code identifying a particular error or a type of errors, a level of the error (e.g., information, warning, slow brake, urgent), as well as a timestamp when the error occurred.

Figure 8:
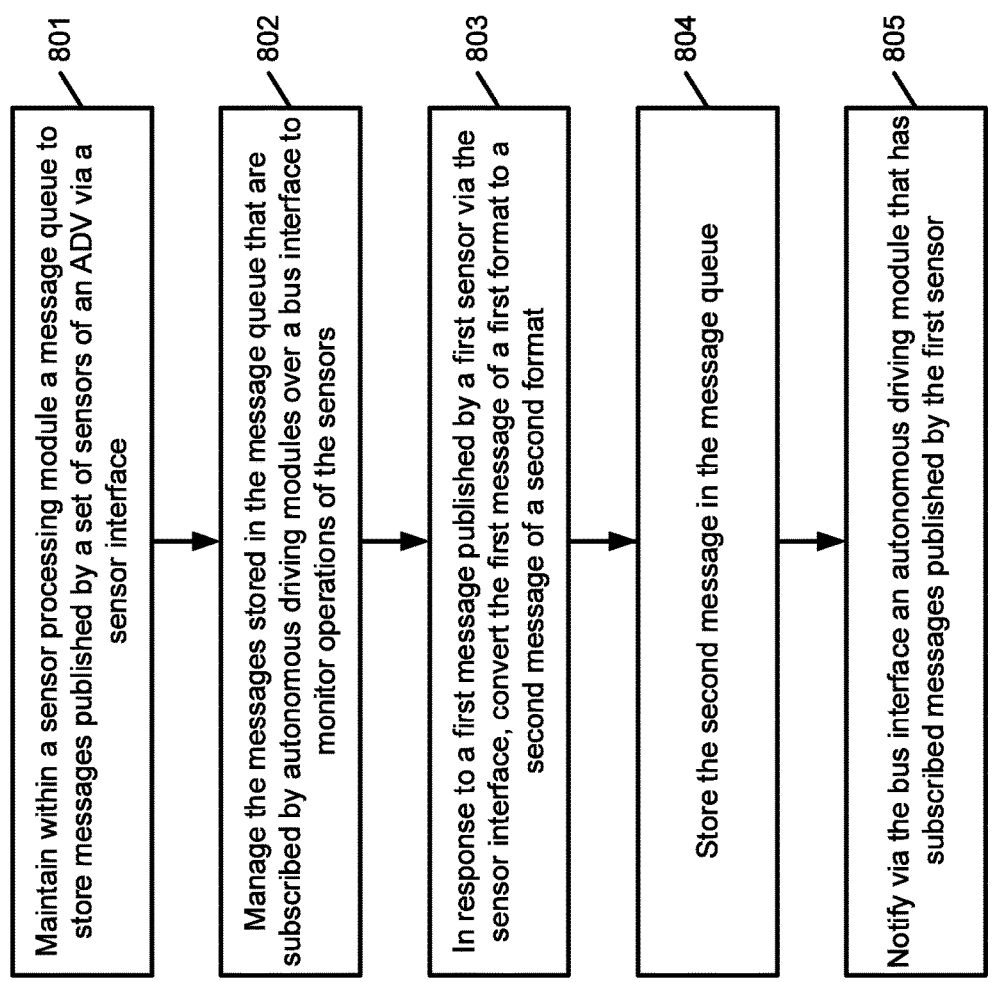
FIG. 8 is a flow diagram illustrating an example of process of a message-based monitoring system for autonomous driving according to one embodiment.

FIG. 8 is a flow diagram illustrating an example of a process for monitoring autonomous driving operations according to one embodiment. Process 800 may be performed by processing logic which may include software, hardware, or a combination thereof. For example, process 800 may be performed by sensor processing module 606. Referring to FIG. 8, at block 801, a message queue is maintained within a sensor processing module to store messages published by a set of sensors mounted on an ADV. The sensor processing module includes a sensor interface coupled to the sensors and a bus interface coupled to a bus. At block 902, the messages stored in the message queue are managed by the sensor processing module to allow various modules (e.g., autonomous driving modules such as perception module 302 or planning module 305) to monitor operations of the sensors such as status of the sensors. In response to a message received from a first sensor as a publisher via the sensor interface, at block 903, processing logic converts the message in a first format to a second message in a second format. At block 904, the second message is stored in a message queue associated with the sensor. At block 905, a first module that has subscribed the messages published by the sensor is notified regarding the availability of the message. As a result, the module can receive the message.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system for operating an autonomous driving vehicle (ADV), the system comprising:
   a plurality of modules, including a perception module to perceive a driving environment surrounding the ADV and a planning module to plan a path to control the ADV to navigate the driving environment;
   a bus coupled to the plurality of modules; and
   a sensor processing module coupled to the bus, wherein the sensor processing module comprises:
      a bus interface coupled to the bus,
      a sensor interface to be coupled to a first set of one or more sensors mounted on the ADV,
      a message queue to store a plurality of messages published by the sensors, and
      a message handler to manage the messages stored in the message queue, which are subscribed by at least one of the modules to allow the modules to monitor operations of the sensors,
         wherein in response to a first message in a first format received from a first sensor of the first set of the one or more sensors, the message handler converts and translates the first message in the first format to a second message in a second format to allow a first module to receive the second message stored in the message queue, and wherein in response to a third message in a third format received from a second sensor of the first set of the one or more sensors, the message handler converts and translates the third message in the third format to a fourth message in the second format to store in the message queue, wherein the first format is different from the second format, the third format is different from the second format, and the second format is a common message format compatible with a subscribing client, and wherein in response to the message handler determining that the second module has registered to subscribe messages published by the second sensor, the message handler notifies a second module via the bus interface to allow the second module to access the fourth message stored in the message queue.

2. The system of claim 1, wherein the message queue comprises a plurality of message buffers, each of the message buffers corresponding to one of the plurality of sensors.

3. The system of claim 1, wherein the message handler is configured to:
store the second message in the message queue; and
notify, via the bus interface, the first module of the modules registered as a subscriber to allow the first module to receive the second message.

4. The system of claim 3, wherein the first format is specified according to a design specification of the first sensor, and wherein the second format is a predetermined format capable of being handled by the modules.

5. The system of claim 3, wherein the message handler is further configured to:
in response to the third message received from the second sensor of the first set via the sensor interface, convert the third message in the third format to a fourth message in the second format; and
store the fourth message in the message queue, wherein the third format is specified according to a design specification of the second sensor.

6. The system of claim 3, wherein the message handler is further configured to:
receive, via the bus interface, a third message from a third sensor of one or more sensors of a second set coupled to the bus;
convert the third message from a third format to a fourth message in the second format; and
store the fourth message in the message queue.

7. The system of claim 6, wherein the message handler is further configured to:
determine that the second module of the modules has registered to subscribe messages published by the second sensor; and
notify, via the bus interface, the second module via the bus interface to allow the second module to access the fourth message stored in the message queue.

8. The system of claim 3, wherein the message handler is further configured to:
receive, via the bus interface, a third message in the second format from the second module of the modules;
determine that the third message has been subscribed by the second sensor of the first set;
convert the third message from the second format to a third format; and
transmit the third message in the third format to the second sensor via the sensor interface.

9. A computer-implemented method for operating an autonomous driving vehicle (ADV), the method comprising:
maintaining, within a sensor processing module, a message queue to store a plurality of messages published by a first set of one or more sensors mounted on the ADV, wherein the sensor processing module includes a sensor interface coupled to the first set of sensors and a bus interface coupled to a bus;
managing the messages stored in the message queue, wherein the messages are subscribed by a plurality of modules to allow the modules to monitor operations of the sensors, wherein the plurality of modules are coupled to the sensor processing module over the bus, and wherein the plurality of modules includes a perception module to perceive a driving environment surrounding the ADV and a planning module to plan a path to control the ADV to navigate the driving environment; and
in response to a first message in a first format received from a first sensor of the first set of the one or more sensors, converting and translating the first message in the first format to a second message in a second format to allow a first module to receive the second message stored in the message queue, and
in response to a third message in a third format received from a second sensor of the first set of the one or more sensors, converting and translating the third message in the third format to a fourth message in the second format to store in the message queue, wherein the first format is different from the second format, the third format is different from the second format, and the second format is a common message format compatible with a subscribing client, and wherein in response to the message handler determining that a second module has registered to subscribe messages published by the second sensor, the message handler notifies the second module via the bus interface to allow the second module to access the fourth message stored in the message queue.

10. The method of claim 9, wherein the message queue comprises a plurality of message buffers, each of the message buffers corresponding to one of the plurality of sensors.

11. The method of claim 9, further comprising:
storing the second message in the message queue; and
notifying, via the bus interface, the first module of the modules registered as a subscriber to allow the first module to receive the second message.

12. The method of claim 11, wherein the first format is specified according to a design specification of the first sensor, and wherein the second format is a predetermined format capable of being handled by the modules.

13. The method of claim 11, further comprising:
in response to a third message received from the second sensor of the first set via the sensor interface, converting the third message in a third format to the fourth message in the second format; and
storing the fourth message in the message queue, wherein the third format is specified according to a design specification of the second sensor.

14. The method of claim 11, further comprising:
receiving, via the bus interface, a third message from a third sensor of one or more sensors of a second set coupled to the bus;
converting the third message from a third format to a fourth message in the second format; and
storing the fourth message in the message queue.

15. The method of claim 14, further comprising:
determining that the second module of the modules that has registered to subscribe messages published by the second sensor; and
notifying, via the bus interface, the second module via the bus interface to allow the second module to access the fourth message stored in the message queue.

16. The method of claim 11, further comprising:
receiving, via the bus interface, a third message in the second format from a second module of the modules;
determining that the third message has been subscribed by a second sensor of the first set;
converting the third message from the second format to a third format; and
transmitting the third message in the third format to the second sensor via the sensor interface.

17. A sensor processing module, comprising:
a sensor interface to be coupled to a plurality of sensors mounted on an autonomous driving vehicle (ADV);
a bus interface to be coupled to a host processor executing one or more autonomous driving modules, including a perception module to perceive a driving environment surrounding the ADV and a planning module to plan a path to control the ADV to navigate the driving environment;
a message-based monitoring module coupled to the sensor interface and the bus interface, wherein the message-based monitoring module is configured to:
maintain a message queue to store a plurality of messages published by the sensors;
manage the messages stored in the message queue, wherein the messages are subscribed by the autonomous driving modules to allow the autonomous driving modules to monitor operations of the sensors; and
in response to a first message in a first format received from a first sensor of the plurality of sensors, convert and translate the first message in the first format to a second message in a second format to allow a first autonomous driving module to receive the second message stored in the message queue, and
in response to a third message in a third format received from a second sensor of the first set of the plurality of sensors, convert and translate the third message in the third format to a fourth message in the second format to store in the message queue, wherein the first format is different from the second format, the third format is different from the second format, and the second format is a common message format compatible with a subscribing client, and wherein in response to the message handler determining that the second module has registered to subscribe messages published by the second sensor, the message handler notifies a second module via the bus interface to allow the second module to access the fourth message stored in the message queue.

18. The sensor processing module of claim 17, wherein the message queue comprises a plurality of message buffers, each of the message buffers corresponding to one of the plurality of sensors.

19. The sensor processing module of claim 17, wherein the message-based monitoring module is further configured to:
store the second message in the message queue; and
notify, via the bus interface, the first autonomous driving module of the autonomous driving modules registered as a subscriber to allow the first autonomous driving module to receive the second message.

20. The sensor processing module of claim 19, wherein the first format is specified according to a design specification of the first sensor, and wherein the second format is a predetermined format capable of being handled by the autonomous driving modules.

* * * * *